United States Patent [19]

Raymond

[11] 4,053,137

[45] Oct. 11, 1977

[54] ELECTROMECHANICALLY OPERATED VALVE

[75] Inventor: Robert E. Raymond, Zanesville, Ohio

[73] Assignee: De Laval Turbine Inc., Princeton, N.J.

[21] Appl. No.: 649,657

[22] Filed: Jan. 16, 1976

[51] Int. Cl.$^2$ .................. F16K 31/08; F16K 31/10
[52] U.S. Cl. .................. 251/65; 251/129; 335/148; 335/222;148
[58] Field of Search .................. 137/82, 85, 625.64, 137/83, 625.61; 251/129, 65; 335/148, 222

[56] References Cited

U.S. PATENT DOCUMENTS

| 1,887,322 | 11/1932 | Nettleton | 137/82 |
|---|---|---|---|
| 2,847,619 | 8/1958 | Shafer | 335/222 |
| 3,004,546 | 10/1961 | Robins et al. | 137/82 |
| 3,207,872 | 9/1965 | Nauer | 335/145 |
| 3,208,352 | 9/1965 | Lucien | 91/51 |
| 3,416,535 | 12/1968 | Kalthoff et al. | 335/222 |
| 3,473,547 | 10/1969 | Coakley | 137/83 |
| 3,618,124 | 11/1971 | Dreisbach | 335/222 |
| 3,628,073 | 12/1971 | Berney | 310/36 |

*Primary Examiner*—Arnold Rosenthal
*Attorney, Agent, or Firm*—Hopgood, Calimafde, Kalil, Blaustein & Lieberman

[57] ABSTRACT

The invention contemplates a virtually hysteresis-free actuator for converting an electrical input current into a substantially rectilineal force or displacement, using a single electrical coil and two spaced and oppositely polarized air gaps. Similarly spaced, opposed parts of the coil are compliantly mounted for and constrained to move in the respective air gaps, the constraint being such as to develop substantially a unidirectional force and/or displacement which is in the plane of the gap-shrouded parts of the coil. Various embodiments of suspension and force-output pick-off and development are described.

13 Claims, 8 Drawing Figures

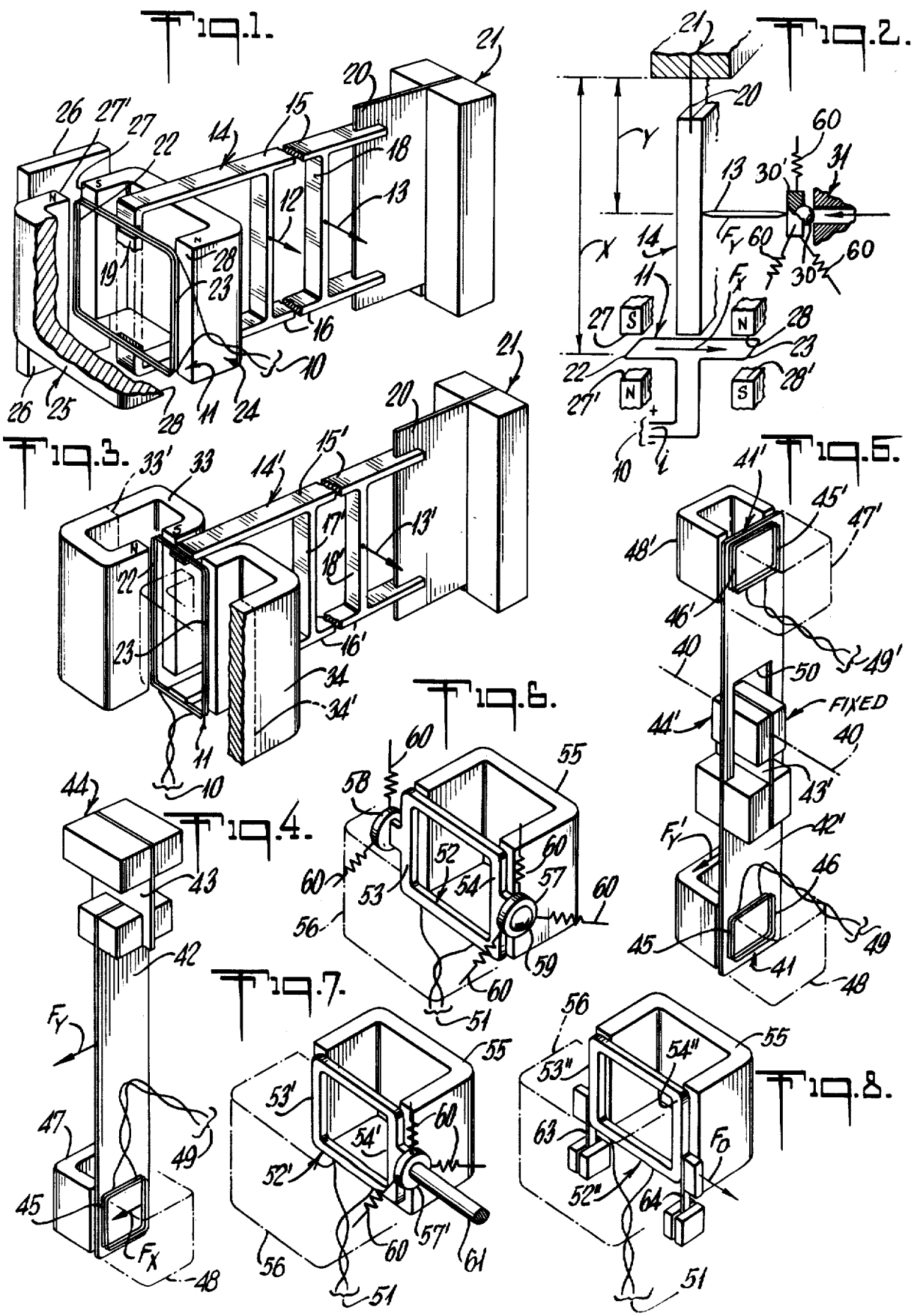

ELECTROMECHANICALLY OPERATED VALVE

The invention relates to electromechanical actuators, of the type producing a substantially rectilineal force or displacement output, as for operation of a valve member in a pressure-fluid system.

Generally speaking, actuators of the character indicated have adopted the moving-iron principle, wherein output force or displacement is taken from an armature that is movably mounted in the gap or gaps of a fixed magnetic-core system. The mechanical force or displacement output are a function of input current to one or more coils which embrace one or more parts of the magnetic core. Because such a system must rely upon change of magnetic-flux density in the core in order to produce corresponding change in mechanical output, hysteresis is a fact of life with which to contend, and if provision is made for suitable feedback control of the electrical-input signal, the hysteresis problem is not insurmountable for most applications. However, the inherent inability of such devices to produce a mechanical output which will accurately track input-current magnitude renders them inherently unsuited to use in so-called open-loop control systems.

I shall note the distinguishing difference between electromechanical power amplifiers and transducers. Electromechanical power amplifiers are exemplified by the above-mentioned moving-iron devices. When operated in closed-loop systems, such devices can be effective in spite of a degree of hysteresis, friction and non-linearity, as long as feedback summing with the control variable is handled by transducers of requisite precision; the precision of the transducers determines ultimate accuracy of control. On the other hand, devices suitable as precision transducers in closed-loop control or in open-loop control must be inherently accurate in order to achieve precision control.

To achieve such accuracy in electrical instrumentation, reliance has been placed upon the moving coil, to receive the input current. The coil is mounted for rotation about its central axis of symmetry, and is placed in the single air gap of a magnetic circuit; output force or displacement is the result of reaction between spaced parts of the coil and the magnetic flux in the gap.

To my best knowledge and belief, particularly in fluidpower applications, moving-iron type devices are always chosen, apparently for their high force, high response characteristics, achievable in a minimum of space. And I know of no such employment of the moving-coil principle.

It is, accordingly, an object of the invention to provide an improved precision transducer or actuator device of the character indicated.

Another object is to provide such a device which is essentially free of magnetic hysteresis.

A further object is to provide a device meeting the above objects and which is essentially friction-free and linear in its mechanical-output force or displacement, in response to and over a range of variation in the magnitude of input electricl current.

A specific object is to provide a precision device of the character indicated, lending itself to precision open-loop control situations, such as those necessarily involved in operation of an electro-hydraulic proportional relief valve which avoids use of electronic feedback transducers, i.e., wherein a pilot valve member is caused to produce in response to a given input direct-current signal, an equivalent mechanical force or displacement output, for pilot-pressure command to a main valve.

It is also a specific object to achieve the foregoing with relatively simple structure, lending itself to relatively low cost fabrication and ease of maintenance without sacrifice of inherent precision.

Other objects and various further features of novelty and invention will be pointed out or will occur to those skilled in the art from a reading of the following specification in conjunction with the accompanying drawings. In said drawings, which show, for illustrative purposes only, preferred forms of the invention;

FIG. 1 is a partly broken-away view in perspective to show one embodiment of the invention;

FIG. 2 is a simplified diagram schematically indicating elements of FIG. 1;

FIG. 3 is a view similar to FIG. 1, to show another embodiment for which the diagram of FIG. 2 is also applicable; and FIGS. 4 to 8 are partly broken-away perspective views to illustrate further embodiments.

Referring to FIG. 1, the invention is shown in application to an electromechanical actuator or transducer wherein current resulting from voltage applied to the flexible leads 10 of a coil 11 develops an actuating output force at 12 or 13, as desired along a coil-supporting beam 14, it being understood that the heavy arrows at 12-13 are schematic showings as to the single direction and relative magnitude of force output at the locations indicated. Beam 14 is of light-weight non-magnetic construction, as of aluminum or molded-plastic; it comprises elongate upper and lower arms 15-16, with connecting spacer elements 17-18 from which one of the force outputs 12-13 is selectively available. At its coil-supporting end, a spacer element 19 of beam 14 is shown notched, for bonded reception and mounting of upper and lower portions of the coil 11. At its other end, a frictionless suspension is achieved via a stiffly compliant flat blade 20, providing an upstanding effective axis of pivotal support with respect to fixed base structure 21. The turns of coil 11 may be generally rectangular; they importantly include spaced leg portions 22-23 which are substantially parallel, and they lie in a plane which is generally normal to the elongation direction of beam 14 and which is parallel to and substantially offset from the effective axis of pivotable support, afforded by the compliant means 20.

It is a feature of the invention that each of the spaced legs 22—23 of the single coil 11 is positioned in a different one of two oppositely polarized air gaps established by magnetized core means, shown in FIG. 1 as two like core members 24-25 which are fixedly mounted to non-magnetic supporting bracket structure 26. The core element 24 is generally U-shaped and is freely received in the beam opening between spacer elements 17-19. Element 24 terminates in flat pole faces 27-28 which lie in an upstanding plane that is substantially parallel to the at-rest plane of coil legs 22-23; these pole faces are rectangular and vertically elongate, in proximity to and overlapping register with coil legs 22-23. Element 24 will be understood to be polarized, as for example by using polarizing current to a coil linked to the magnetic core, but I prefer and show use of permanently polarized core material (e.g., Alnico 5), to establish North (N) polarization at 28 and South (S) polarization at 27. In like manner, the respective pole faces 27'-28' of core element 25 are positioned directly opposite the faces 27-28, and the polarization of element 25 is such as to present oppositely polarized poles at the air gaps to faces 27-28, as suggested by "N" and "S" notation applied to the ends of element 25.

Core elements 24-25 and their air gaps (at 27-28) establish a single polarized flux path loop wherein the polarization of flux traversing the gap at 27 is equal and opposite to that which traverses the gap at 28. And since the direction of a direct current flowing in leg 22 is always equal and opposite to that which flows in leg 23, the legs 22-23 will develop identical force reactions, in the same direction in the plane of legs 22-23, to thus produce a turning moment about the effective pivot axis established by the compliance 20. These force reactions are additive and at relatively large radius about the effective pivotal axis of compliance 20, so that force pick-off at 12 or 13 will represent amplification in accord with the applicable mechanical advantage.

FIG. 2 schematically illustrates the basic elements of FIG. 1 structure and affords a convenient means of identifying dimensional relationships. The electromagnetic coil-reaction force is identified $F_x$ and is at the extreme effective radius X determined by compliant suspension of the full length of beam 14. Output-force pick-off at 13 is identified $F_y$ and is at the lesser effective radius Y, thus reflecting an X:Y mechanical advantage at 13. By way of illustration, the pick-off means 13 is shown applied to the mount for a spherical valve member 30 poised at the open discharge end of a passage for continuous hydraulic flow in a pilot valve body 31, as suggested by arrow designation.

In further illustration, for the case of each coil leg 22-23 of 1-inch effective length, a coil 11 of 1000 turns, and for a maximum current (i) of 0.60 amperes in an air-gap flux density of 2000 Gauss, the leg force is 1.35 lbs., being directly calculated from the classic relation:

$$F = 1.140 \times 10^{-6} B_g.i.L.N$$

where:
$B_g$ = Air gap flux density (Gauss)
$i$ = Current (amperes)
$L$ = Effective length (inches)
$N$ = Number of turns This classic relation is normally used in conjunction with radius about a rotary axis to determine torque about that axis, and in such context each coil leg contributes its half of the force (in opposite directions about the axis); but since we are here concerned with a rectilineal output (provided by two coil-leg forces in the same direction), the force $F_x$ is twice that for each leg, being 1.35 lbs. for the stated conditions. And if the radius relation X:Y is 5:1, then $F_y$ is 6.75 lbs. This will be recognized as a highly acceptable maximum control force with which to operate the pilot valve element 30.

The modification of FIG. 3 differs from that of FIG. 1, in that dimensional requirements of the beam 14' for support of the moving coil 11 may be substantially reduced, through a different configuration of the magnetic-core means for establishment of the oppositely polarized air gaps. The compliant suspension remains as previously described, and so the same reference numbers are again used. In FIG. 3, the coil 11 is supported and retained by notches or grooves at the ends of the upper and lower beam members 15', with spacers 17'-18' reduced to accord with the vertical span of coil 11. The oppositely polarized gaps for coil legs 22-23 are provided by like, suitably polarized core elements 33-34, each providing the opposed pole faces of a different one of the two gaps. The polarized relation again is designated by "N" and "S" notation, as appropriate, and is seen to conform to the same FIG. 2 schematic which serves FIG. 1. Each of the core elements 33-34 may be of single-piece construction, but dotted lines 33'-34' indicate the abutment plane in the event it should be more convenient to make each of the elements 33-34 in two halves, abutted at 33'-34'. Operation is in every respect as described for FIG. 1.

In the embodiment of FIG. 4, the moving coil 41 is carried at one end of a blade-like beam 42 that is suspended by a relatively stiffly compliant member 43 from fixed mounting means 44. The nature of the suspension is to establish an effective pivot axis, via the bendable mode of member 43, such axis being normal to the plane of the spaced parallel legs 45-46 of coil 41, and such axis being substantially offset from coil 41. The coil legs 45-46 are respectively positioned in oppositely polarized air gaps that are established by and between magnetic-core elements 47-48, in the manner discussed in conjunction with elements 24-25 of FIG. 1. Beam 42 may be of suitable non-magnetic material, such as aluminum or plastic, with coil 41 affixed thereto or set therein, as desired. It is convenient to adhere coil leads 49 to one face of beam 42, thus allowing external electrical connection to be made to the device at a beam location of lesser-displacement magnitude. Except for the difference as to effective pivot-axis orientation, operation in FIG. 4 is as described for FIG. 1, the output-force pick-off from beam 42 being suggested at the heavy arrow labeled $F_y$, based on coil-reaction force developmment suggested at $F_x$.

The lower half of the embodiment of FIG. 5 will be recognized for its similarity to FIG. 4, and so corresponding reference numbers are used. The point of different is that in FIG. 5, the beam 42' is much more elongate; its effectively pivotal, generally central suspension is provided by a single compliant blade 43 with fixed-end mounting 44', shown in ample lateral-clearance relation to the margins of a large central opening 50 in beam 42'. At its other end, beam 42' carries a second electrical input coil 41' which meets the general description of coil 41 and which has opposed parallel legs 46'-47' positioned within the oppositely polarized spaced air gaps of further fixedly mounted magnetic-core elements 47'-48'. It will be understood that upon application of different d-c input signals, at 49'-49' respectively, each of the coils 41-41' will develop its own beam-rotating torque about the effective pivot axis established by compliant means 43'. If these input signals are in opposed sense, the output-force $F_y'$ will reflect the difference between forces developed by the respective coils, and if these input signals are in the same sense, the force $F_y'$ will represent the sum of the two coil-reaction forces, at a magnitude reflecting mechanical advantage attributable to the relative effective radii of $F_y'$ pick-off and of the two coils.

Aside from the above-noted algebraic summing property of the FIG. 5 structure, still further advantages will be seen for the case in which all parts are symmetrically formed and balanced with respect to a central axis of the system, for example, as denoted by the phantom line 40. In such event, further symmetry is available as to beam suspension by extending the compliant blade 43' so as to provide the same engagement of the fixed mount 44' to both the upper and lower halves of beam 42'. With the mechanical balance thus achievable by symmetry of the beam and its suspension, both symmetries being about the same axis 40, the system is inherently resistive to mechanical shock involving rectilineal bodily displacement or acceleration of the mount 44'.

The embodiments of FIGS. 6, 7 and 8 are all illustrative of the invention in the circumstance in which beam suspension can be dispensed with; for example, to reduce mass and thus inertia to a minimum, or to provide output-force pick-off in the plane of the spaced parallel driving legs of the coil. In all these embodiments, it is convenient to embed the wound coil in a suitable non-magnetic plastic, such as glass-fibre filled epoxy, to enable cured consolidation into a relatively rigid open-rectangular form. In FIG. 6, the moving coil, excited by leads 51, will be understood to be contained or "potted" into the open-rectangular form 52, wherein the spaced parallel driving legs 53–54 are movably positioned in spaced parallel and oppositely polarized air gaps, between magnetic-core elements 55–56 of the nature described for FIG. 1. Integrally formed with the potted-coil form 52 are oppositely projecting mounting arms, with integral mounting bosses 57–58, all in alignment with the axis of coil-force development, being in the plane of and perpendicular to legs 53–54. One or both of the bosses 57–58 may be formed to permanently retain a valve member 59, here shown spherical, as for a hydraulic-flow pilot-valve employment of the nature alluded to at 30–31 in FIG. 2. In order to eliminate friction or mechanical hysteresis in the suspension of coil means 52, I have schematically indicated a totally compliant suspension comprising three equally (angularly) spaced springs 60, connecting each boss 57, 58, to outer frame structure (not shown). With such suspension, it will be understood that valve-member displacements and forces are inherently self-centering on the axis of coil-force development.

FIG. 7 will be recognized for its similarity to FIG. 6 and so corresponding reference numbers are adopted, where applicable. In FIG. 7, however, the potted-coil form 52' is secured to or formed with a stem projection 61 extending in the line of coil-force development. Stem 61 may be part of valve mechanism that is otherwise not shown; for example a spool or other valve member may be formed at or mounted upon the projecting end of stem 61, so that stem 61 may be deemed to be part of valve-member structure. In the event that such structure is guided at its projecting end, there may or may not be need for a compliant support in the region of coil-force development; thus only one such suspension 60 is shown in FIG. 7.

FIG. 8 will also be recognized for its similarity to FIG. 6, and so the same reference numbers are again adopted, as applicable. The point of difference in FIG. 8 is that suspension of the potted-coil form 52" is by way of two spaced parallel frame-referenced compliant blade elements 63–64, shown anchored to the lower ends of the vertical coil-leg forms 53"–54". Force pick-off is schematically indicated at the heavy arrow $F_o$.

The described embodiments of the invention will be seen to have achieved all stated objects, and the ability to perform has already been confirmed experimentally. In application of the stated illustrative coil size and polarized flux density, and at input current leads within the indicated maximum, a clearly linear relation has been observed between (a) current taken at ten increments up to 0.5 ampere and (b) hydraulic pressure behind the flow denoted by an arrow in the valve structure of FIG. 2, i.e., using the compliant beam suspension and valve-member actuation described in connection with FIG. 2, the only additional further feature being that the valve-member mounting 30' of FIG. 2 was compliantly suspended by a three-spring network as described at 60 for one of the bosses 57–58 of FIG. 6. In these observations, the valve-seat diameter was 0.050 inch, meaning that the required transducer-output force $F_y$ was 1.96 lbs./1000 PSI. The observed linear relationship covered hydraulic pressures to just short of 1000 PSI, but there is absolutely no reason why such linearity cannot extend to a multiple of this pressure, using the described techniques. Importantly, the observed current:pressure relation was completely and reversibly retraceable, with no hysteresis; on the other hand, comparative observation of a stock moving-iron torque motor under comparable ranges of current and pressure revealed characteristic hysteresis, amounting for example to a 75 PSI difference between observed pressure for say a 0.3-ampere input signal, depending upon whether this signal magnitude was achieved under the condition of increasing-current values or under a decreasing-current condition.

Nor is the invention to be deemed to be limited to the described embodiments. For example, the designation 11 for the coil means will be understood also to cover a situation wherein more than one coil is wound to the same basic requirements described for coil 11, both such coils being on to the same form and effectively in registered side-by-side adjacency. One such coil may be used as an open circuit, i.e., with the described response to the input control signal, while the other such coil is connected for closed-circuit use, as to develop a desired rate damping of the compliantly suspended beam; thus connected, rate damping utilizes such induced-current force reaction as is generated by rapid cutting of the magnetic lines of force. Alternatively, by forming both coils in open circuit, there is inherent provision for each coil to serve a different input signal, so that the net force output ($F_y$) will reflect instantaneous algebraic resolution of the two input signals, with inherent electrical isolation of the circuits relied upon to independently supply these input signals.

Still further, the single compliant blade by which the beam is suspended will be understood to schematically designate a simple (single-spring) or compound (multiple-spring) configuration, additional spring element or elements being compliantly yieldable consistent with the single axis about which the beam is effectively pivoted. Such compounding of compliant elements will be understood to enable a null-balance control adjustment of the beam position, for example, for a given single condition of input current and output force (or hydraulic pressure, as in FIG. 2); such compounding also enables effective selection of the physical magnitude of compliant whereby a particular beam-oscillation frequency characterizes the suspension, to best serve particular application requirements.

While the invention has been described in detail for the preferred forms shown, it will be understood that further modifications may be made within the scope of the invention.

What is claimed is:

1. Electromechanically operated valve structure, comprising a valve body having a passage for pressure fluid flow, a movable ball-poppet valve member for controlling said flow, a valve-member suspension comprising at least three like radially extending coil springs angularly spaced about the axis of valve-member movement, the inner ends of said springs being connected to said valve member and the outer ends of said springs being fixed, and actuating means for said valve member; said actuating means comprising magnetic-core means establishing two spaced substantially parallel gaps which are directionally polarized in opposite directions, an electrically conductive coil having a course defining two substantially parallel legs that are spaced substantially in accordance with the spacing of said gaps, means including a compliantly suspended beam movably mounting and orienting said coil with respect to said core means such that each of said legs is positioned with clearance within and substantially parallel to a different one of said gaps, said mounting means constraining and guiding said coil for movement which is substantially in the plane of said legs and normal to the orientation of said legs, said valve member being so connected to said mounting means that said flow is controlled in response to excitation of said coil.

2. Electromechanically operated valve structure, comprising a valve body having a passage for pressure fluid flow, a movable ball-poppet valve member for controlling said flow, and actuating means for said valve member; said actuating means comprising magnetic-core means establishing two spaced substantially parallel gaps which are directionally polarized in opposite directions, an electrically conductive coil having a course defining two substantially parallel legs that are spaced substantially in accordance with the spacing of said gaps, compliant suspension means movably mounting and orienting said coil with respect to said core means such that each of said legs is positioned with clearance within and substantially parallel to a different one of said gaps, said mounting means constraining and guiding said coil for movement which is substantially in the plane of said legs and normal to the orientation of said legs, said valve member being connected to said mounting means substantially in the plane of and movable substantially normal to said legs, said suspension means including a valve-member suspension comprising at least three like radially extending coil springs angularly spaced about the axis of valve-member movement, the inner ends of said springs being connected to said valve member and the outer ends of said springs being fixed, and said valve member being so positioned with respect to the valve-body passage that said flow is controlled in response to excitation of said coil.

3. Electromechanically operated valve structure, comprising a valve body having a passage for pressure fluid flow, a movable ball-poppet valve member for controlling said flow, a valve-member suspension comprising at least three like radially extending coil springs angularly spaced about the axis of valve-member movement, the inner ends of said springs being connected to said valve member and the outer ends of said springs being fixed, and actuating means for said valve member; said actuating means comprising magnetic-core means establishing two spaced substantially parallel gaps which are directionally polarized in opposite directions, an electrically conductive coil having a course defining two substantially parallel legs that are spaced substantially in accordance with the spacing of said gaps, compliant suspension means movably mounting and orienting said coil with respect to said core means such that each of said legs is positioned with clearance within and substantially parallel to a different one of said gaps, said mounting means constraining and guiding said coil for movement which is substantially in the plane of said legs and normal to the orientation of said legs, said valve member being so connected to said mounting means that said flow is controlled in response to excitation of said coil.

4. Valve structure according to claim 3, in which said suspension means includes a flat compliantly bendable member fixedly mounted at one end and suspending said coil from its other end.

5. Valve structure according to claim 3, in which said suspension means includes a set of three like radially extending coil springs angularly spaced about the axis of valve-member movement, the inner end of each of said springs being connected to said valve member and the outer ends of said springs being fixed.

6. Valve structure according to claim 4 in which said flat bendable member is one of two like members in parallel spaced array.

7. Valve structure according to claim 4, in which the span between fixed-mounting connection and coil-mounting connection to said flat bendable member is shorter than the width dimension of said bendable member, whereby a single such bendable member will provide said motional constraint and guidance through single-mode effectively pivotal bending.

8. Valve structure according to claim 1, in which the elongation axis of said beam extends substantially normal to the plane of said legs and in which said beam suspension comprises a relatively thin, flat and stiffly compliant element having essentially a single compliant bending mode which defines the axis of effective pivotal mounting, the axis of effective pivotal mounting being substantially parallel to said legs.

9. Valve structure according to claim 1, in which the elongation axis of said beam extends substantially in the plane of said legs, and in which said suspension means comprises a relatively thin, flat and stiffly compliant element having essentially a single compliant bending mode which defines the axis of effective pivotal mounting, the axis of effective pivotal mounting being substantially normal to the plane of said legs.

10. Valve structure according to claim 1, in which said beam suspension comprises a relatively thin, flat and stiffly compliant element having essentially a single compliant bending mode which defines an axis of effective pivotal mounting, said coil being thus constrained for beam-pivoted movement about said axis and at a first and relatively large radius about said axis, said valve member being effectively connected to said beam at a second and relatively small radius about said axis.

11. Valve structure according to claim 1, in which said beam suspension comprises a relatively thin, flat and stiffly compliant element having essentially a single compliant bending mode which defines an axis of effective pivotal mounting, said magnetic-core means and coil together comprising one of a plurality of independent electromechanical connections to said beam.

12. Electromechanically operated valve structure, comprising a valve body having a passage for pressure fluid flow, a movable ball-poppet valve member for controlling said flow, said valve member being compliantly suspended by a set of like radially extending coil springs angularly spaced about the motional axis of said valve member, and actuating means for said valve member; said actuating means comprising magnetic-core means establishing two spaced substantially parallel gaps which are directionally polarized in opposite directions, an electrically conductive coil having a course defining two substantially parallel legs that are spaced substantially in accordance with the spacing of said gaps, a compliantly suspended elongate rigid beam movably mounting and orienting said coil with respect to said core means such that each of said legs is positioned within and substantially parallel to a different one of said gaps, the suspension of said beam comprising a single relatively thin, flat and stiffly compliant element having essentially a single compliant bending mode which defines an axis of pivotal mounting, said coil being mounted to said beam at a first and relatively large radius about said axis, said beam constraining and guiding said coil for pivotal movement which is substantially in the plane of said legs and normal to the orientation of said legs, said valve member being effectively connected by abutment with said beam at a second and relatively small radius about said axis such that flow is controlled in response with mechanical advantage in response to excitation of said coil.

13. Electromechanically operated valve structure, comprising a valve body having a passage for pressure-fluid flow, a movable ball-poppet valve member for controlling said flow, and actuating means for said valve member; said actuating means comprising magnetic-core means establishing two spaced substantially parallel gaps which are directionally polarized in opposite directions, an electrically conductive coil having a course defining two substantially parallel legs that are spaced substantially in accordance with the spacing of said gaps, a rigid frame supporting said coil legs and mounting said valve member centrally of one of said legs for axial movement normal to said legs, and first and second like sets of at least three angularly spaced radially extending coil springs, the inner ends of the springs of one of said sets being connected to support said valve-member leg on the axis of valve-member movement, and the inner ends of the springs of the other of said sets being connected to support the other of said legs on said axis, the outer ends of all springs being fixed.

* * * * *